3,772,220
FLEXIBLE FIRE RETARDANT POLYISOCYANATE MODIFIED NEOPRENE FOAM

John A. Parker, Los Altos, and Salvatore R. Riccitiello, San Jose, Calif., assignors to the United States of America as represented by the Administrator of the National Aeronautics and Space Administration
No Drawing. Filed Apr. 21, 1971, Ser. No. 136,253
Int. Cl. C08d 9/08, 13/08
U.S. Cl. 260—2.5 L                              3 Claims

ABSTRACT OF THE DISCLOSURE

Lightweight, fire resistant foams are provided wherein conventional neoprene-isocyanate foams are modified by the addition of an alkyl halide polymer.

---

The invention described herein was made by employees of the United States Government and may be manufactured and used by or for the Government for governmental purposes without the payment of any royalties thereon or therefor.

BACKGROUND OF THE INVENTION

Field of the invention

Fire retardant plastic foam.

Description of the prior art

Polyisocyanate reinforced elastomeric foams wherein a latex of an elastomer is combined with an isocyanate are well known and are described in detail in U.S. Pats. 2,993,013 and 3,450,649. Such foams are highly useful for many purposes but they do not provide char integrity when subjected to a sustained ablation environment. Thus, they do not provide continuing protection under many conditions. Such foams, although they are normally non-burning, will ignite and smolder for long periods of time when impacted with projectiles.

SUMMARY OF THE INVENTION

The object of the present invention is to provide a plastic foam which will protect structures such as reentry vehicles or aircraft against damage by heat. The source of heat might be from a fire generated on the structure, such as by an impact with a projectile or the like, or by the hot gas cap which surrounds reentry vehicles. In order to damage the underlying structure, heat must be carried to the structure either by forced or free convection or by radiation.

Foams heretofore known provided a high resistance to heat flow between the heat source and the structure but such foams did not have a high char integrity so that the char would break away, leaving the structure unprotected.

Another protection mechanism is the release of gases from the thermal protective material when it is subjected to heat. The gases evolved serve to protect the system by flowing against the incoming heat, thus impeding the flow of heat from the surface, and also if one provides a gas which is rich in halogens, they can chemically scavenge the chain carriers by which fuel flames are propagated and thus serve as fire extinguishing agents.

In accordance with the present invention, neoprene-isocyanate foams are modified by the addition of from 10 to 30% by weight of a polymeric alkyl halide. Suitable polymeric alkyl halides include all of the well-known vinyl and vinylidene halide homopolymers and copolymers. Included are homopolymers of vinyl chloride, bromide, and fluoride; homopolymers of vinylidene chloride, bromide, and fluoride; copolymers of vinyl and vinylidene chloride, bromide, and fluoride with at least one other polymerizable monoolefin such as acrylonitrile, a vinyl ester of a lower alkanoic acid, such as vinyl acetate, vinyl butyrate and the like. The molecular weight may vary from a low to a high value; i.e., from a low molecular weight liquid to a high molecular weight solid. The solid foam can be made by conventional systems and it is only necessary to add finely dispersed alkyl halide to the neoprene latex during the normal processing.

Extensive tests have shown that the modified neoprene-isocyanate foams of the present invention are much superior in heat protection properties than the neoprene-isocyanate foams heretofore employed both for ballistic and ablative purposes.

DESCRIPTION OF THE PREFERRED EMBODIMENTS

In carrying out the present invention any of the various sulfur curable latexes can be used. One particularly suitable latex is known as neoprene latex Type 1 which is a high gel aqueous dispersion of a polycloroprene polymer having a pH of 10.7, a solids content of 59% and a Brookfield viscosity of 350 cps. A similar latex is known as Type 2 having a pH of 12, a solids content of 50% and a Brookfield viscosity of 23 cps. In addition to latexes of the neoprene type, one may use styrenebutadiene copolymers. One suitable latex is known as SER which has a solids content of 73%, a pH of 10.5 and a Brookfield viscosity of 1330. Natural rubber latexes can also be used and one suitable latex has a rubber solids content of about 60%. Other latexes of rubber-like compounds can be used such as those made from acrylonitrile or from ethylene-propylene mixtures copolymerized with dienes.

A large variety of polyisocyanates can be employed including all of those described in Pat. 3,450,649. One particularly suitable polyisocyanate is sold under the trade name PAPI and this contains about 50% by weight of 4,4'-methylene bis-(phenyl isocyanate) and is made by the phosgenation of polyamides prepared by condensing aniline and formaldehyde in a mineral acid. The product also contains polyisocyanates and phosgenation by-products in such amounts that the average functionality of the entire mixture is about 3 isocyanato groups per molecule.

Various polymeric alkyl halides may be employed as previously defined. Suitable commercial alkyl halides are Saran A, a polyvinylidene chloride homopolymer; VMCH, which is a commercially available acid modified vinyl chloride-vinyl acetate copolymer of medium molecular weight; Tedlar, a poly (vinylidene fluoride) resin; other resins made by Dow Chemical Company of the Saran type which are copolymers of vinylidene chloride and vinyl chloride or acrylonitrile; Dow polyvinyl chloride homopolymers such as Dow 100 (a high molecular weight resin) and Dow PVC 166 (an extra low molecular weight resin) as well as intermediate members of the series and Fluorel, a fluorinated polymer.

Other components can be added to the foam mixture as are well known to those skilled in the art, such as gelling agents, vulcanizing agents, antioxidants, and the like. Typical materials are described in detail in the working examples.

The mixing procedure is not particularly critical and that given in the working examples can be employed. It is important that the isocyanate be added just before the pour. The temperature of the final cure in the oven may be at a temperature above room temperature, e.g., from 150° F. to 300° F. If optimum char strength and integrity are desired, the cure temperature must be maintained between 275° F. and 300° F. The curing time is about four hours. If the temperature goes much above 300° F., for example, to about 325° F., the material burns in the oven.

For ballistic purposes the cure temperature is not important since it is only necessary to provide sufficient hydrogen halide (from the decomposition of the alkyl halide) to quench the fire which would otherwise result. For ablative purposes, char strength and integrity are important and one should employ the higher temperature range for optimum results.

In carrying out all of the examples, the following materials were used.

| Formulation: | Dry-wt. parts |
| --- | --- |
| Latex compound | 100.0 |
| Petrolatum | 3.0 |
| Masterbatch | 9.5 |
| Thiate B | 2.0 |
| Tepidone | 1.0 |
| Isocyanate LD-699 | 20.0 |
| Gelling agent | 2.0 |
| Polymeric alkyl halide | 0-30 |

| Ingredients of masterbatch: | Parts by weight |
| --- | --- |
| Zinc oxide (Kadox 15) | 79 |
| Neozone D (Du Pont Co.) | 21 |
| Maraperse N (10%) | 57 |

| Gelling agent: | |
| --- | --- |
| Patossium silico fluoride | 100 |
| Bentonite clay | 20 |
| Water | 380 |

Latex compound is Du Pont's LD-700 neoprene conversion latex described above as Type 1.

Neozone D is Du Pont's trademark for a rubber antioxidant phenyl beta naphthyl amine.

Thiate B is R. T. Vanderbilt's trademark for a trialkyl thiourea neoprene accelerator.

Tepidone is Du Pont's trademark for a dithiocarbamate rubber accelerator.

LD-699 is Du Pont's trademark for its polyisocyanate known as PAPI.

Marasperse is American Can Company's trademark for a phenyl propane lignosulfonate dispersant.

A mixer was employed for mixing the components together, and for curing purposes an electric or gas fired oven capable of maintaining 300° F. was used. The latex compound is first placed in the mixer and the mixer started. Thereafter at short intervals one adds the petrolatum, the masterbach, Thiate B, Tepidone and then the alkyl halide polymer. Mixing is then continued and finally the isocyanate and the galling agent are added. After a very short mixing of the complete batch, e.g., 30 seconds, the mixer is stopped and the material is poured into previously prepared molds. The molds are allowed to stand for about three hours at room temperature and at this point they have sufficient strength to be demolded. The foam is then allowed to dry in the air for about four hours and finally it is cured in an oven at the temperature specified in the examples for four hours.

Utilizing the procedure set forth above, the following materials were prepared:

EXAMPLE 1

A neoprene-isocyanate foam was prepared containing no alkyl halide to serve as a control. In Examples 1 through 5 the foam was cured at 300° F. for four hours.

EXAMPLE 2

A foam was prepared containing 20% by weight of VMCH.

EXAMPLE 3

A foam was prepared containing 20% of Saran A.

EXAMPLE 4

A foam was prepared containing 30% of VMCH.

EXAMPLE 5

A foam was prepared containing 30% of Saran A.

EXAMPLE 6

A foam was prepared containing 10% of Saran A and it was cured at 250° F.

EXAMPLE 7

A foam was prepared containing 10% of Saran A and it was cured at 300° F.

EXAMPLE 8

A foam was prepared containing 10% of VMCH and it was cured at 250° F.

EXAMPLE 9

A foam was prepared containing 10% of VMCH and it was cured at 300° F.

A series of test were run comparing the materials of the present invention with the neoprene-isocyanate foams of the prior art. In the first of these tests, a test fixture was employed known as the Ames 3-Terminal Test Facility. This is essentially an oil burner which burns JP-4 jet fuel in a fire brick lined combustion chamber at a rate of about 1½ gallons per hour. The combustion chamber had various openings so that samples could be tested at a desired heating rate. The heating rate selected was 10 B.t.u./ft.$^2$ per second and the test consisted of placing a sample of the cured foam over an opening in the combustion chamber with an aluminum backing plate over the sample. A temperature sensing device was placed over the backing plate so that one could check to see how long it required for the plate to reach a set temperature. In the case of some samples, the foam burned through before the temperature was attained and this is marked BT. The following results were obtained:

| Example | Materials | Alkyl halide polymer | Thickness (inches) | Density (lb./ft.$^3$) | Time to reach 200° F. (seconds) | Temp., ° F. |
| --- | --- | --- | --- | --- | --- | --- |
| 1 | Neoprene isocyanate | None | 2 | 6.0 | 1 90 | 300 |
| 2 | do | VMCH (polyviny chloride-acetate copolymer), 20% | 2 | 6.1 | 135 | 188 |
| 3 | do | Saran A, 20% | 2.25 | 5.4 | 225 | 260 |
| 3 | do | do | 2.25 | 5.5 | 260 | 280 |
| 4 | do | VMCH, 30% | 2 | 6.5 | 169 | 230 |
| 5 | do | Saran A, 30% | 2 | 6.4 | 195 | 205 |
| 6 | do | Saran A, 10% | 2.25 | 4.4 | 1 190 | |
| 7 | do | do | 2.00 | 5.5 | 150 | 205 |
| 8 | do | VMCH, 10% | 2.00 | 3.2 | 1 120 | |
| 9 | do | do | 2.00 | 6.1 | 130 | 190 |

1 B.T.

It can be seen from the above table that in the case of Example 1, which typifies the prior art, a 2-inch sample burned through in 90 seconds. Examples 2 through 5, 7 and 9 did not burn through and required from 130 to 260 seconds to reach 200° F. Examples 6 and 8 burned through, showing the effect of curing at a low temperature but these materials were satisfactory for ballistic purposes as the next table shows.

In another series of tests, a test fixture was used wherein 50 caliber API bullets were fired at an aluminum striker plate set at an angle of about 45 degrees to boreline. The layer of foam under test covered the aluminum striker plate. The shots were fired at a distance from about 250 feet at a velocity of about 3,000-3,100 feet per second. The foam was observed after the test as to the burning and degree of damage. The results of this test are set forth on the following table:

BALLISTICS TESTS—50 CALIBER ROUND

| Material | Polymeric alkyl halide | Cure temp., °F. | Density | Remarks |
|---|---|---|---|---|
| Neoprene isocyanate | None | 250 | 2.8 | Burned and smoldered after impact. |
| Do | 10% VMCH | 250 | 3.7 | Large tears. |
| Do | 10% Saran A | 150 | 3.6 | Small hole—small tears. |
| Do | 20% Saran A | 250 | 3.2 | Small tears. |
| Do | 30% Saran | 300 | 3.3 | Small tears—no burning. |

It will be seen from the above that material containing the alkyl halide is satisfactory for ballistic purposes even when cured at temperatures as low as 150° F.

We claim:

1. In the process for the preparation of a foam by frothing an aqueous latex of sulfur curable elastomeric polymer wherein said latex contains from about 10 to 100 parts by weight of an organic polyisocyanate per hundred parts of elastomeric solid in the latex, the improvement comprising incorporating in said frothing mixture from 10 to 30% by weight of a polymeric vinyl or vinylidene halide and curing the resulting foam at a temperature of from 275° to 300° F. for about four hours.

2. The process of claim 1 wherein the vinyl or vinylidene halide is selected from vinyl and vinylidene halide homopolymers and copolymers.

3. The process of claim 1 wherein the aqueous latex is a latex of neoprene prepared from polychloroprene polymer having a solids content of about 59%, and the organic polyisocyanate is an undistilled polyisocyanate mixture prepared from the phosgenation of polyamines prepared by condensing aniline and formaldehyde in a mineral acid containing about 50% by weight of 4,4'-methylene bis-(phenyl isocyanate) and the remainder of the product consists of polyisocyanates and phosgenation byproducts wherein the average functionality of the entire mixture is about 3 isocyanato groups per molecule.

References Cited
UNITED STATES PATENTS

| | | | |
|---|---|---|---|
| 3,627,710 | 12/1971 | Crary | 260—2.5 L |
| 3,393,166 | 7/1968 | Rupar | 260—2.5 L |
| 3,033,804 | 5/1962 | Bethe et al. | 260—2.5 FP |

FOREIGN PATENTS

| | | | |
|---|---|---|---|
| 966,260 | 8/1964 | Great Britain | 260—2.5 L |

WILBERT J. BRIGGS, SR., Primary Examiner

U.S. Cl. X.R.

260—2.5 H, 2.5 BE, 2.5 FP, 29.7 UA, 890, Dig. 24